(12) United States Patent
Erler et al.

(10) Patent No.: US 11,474,347 B2
(45) Date of Patent: Oct. 18, 2022

(54) WAVEGUIDE AND DEVICES FOR DATA REFLECTION

(71) Applicant: Carl Zeiss Jena GmbH, Jena (DE)

(72) Inventors: Christoph Erler, Jena (DE); Mirko Riethmüller, Leipzig (DE); Andreas Lütz, Jena (DE); Alexandre Gatto, Jena Münchenroda (DE); Mario Sondermann, Quohren (DE)

(73) Assignee: Carl Zeiss Jena GmbH, Jena (DE)

( * ) Notice: Subject to any disclaimer, the term of this patent is extended or adjusted under 35 U.S.C. 154(b) by 248 days.

(21) Appl. No.: 16/328,056

(22) PCT Filed: Aug. 10, 2017

(86) PCT No.: PCT/EP2017/070319
§ 371 (c)(1),
(2) Date: Feb. 25, 2019

(87) PCT Pub. No.: WO2018/036834
PCT Pub. Date: Mar. 1, 2018

(65) Prior Publication Data
US 2019/0187465 A1 Jun. 20, 2019

(30) Foreign Application Priority Data
Aug. 26, 2016 (DE) ...................... 10 2016 115 938.7

(51) Int. Cl.
*G02B 27/00* (2006.01)
*G02B 27/01* (2006.01)
(Continued)

(52) U.S. Cl.
CPC ........... *G02B 27/0081* (2013.01); *G02B 6/00* (2013.01); *G02B 27/0101* (2013.01);
(Continued)

(58) Field of Classification Search
CPC ........ G02B 27/0172; G02B 2027/0178; G02B 27/0176; G02B 27/0101;
(Continued)

(56) References Cited

U.S. PATENT DOCUMENTS 6,580,529 B1 * 6/2003 Amitai ..................... G02B 5/32
359/13
6,829,095 B2 * 12/2004 Amitai ................. G02B 6/0018
359/629
(Continued)

FOREIGN PATENT DOCUMENTS

DE 102008005817 A1 7/2009
DE 102012213685 A1 5/2014
(Continued)

OTHER PUBLICATIONS

Caputo, Roberto, "Short Period Holographic Structures for Backlight Display Applications", 2007 Optical Society of America, vol. 15, No. 17, Aug. 20, 2007, 13 pages.
(Continued)

*Primary Examiner* — William R Alexander
*Assistant Examiner* — Sharrief I Broome
(74) *Attorney, Agent, or Firm* — Murphy, Bilak & Homiller, PLLC (57) ABSTRACT

Provided is a waveguide arrangement, comprising a diffractive input coupling element (11), in particular a volume hologram, a diffractive output coupling element (13), in particular a volume hologram, and optionally a beam expansion element (12), in particular a volume hologram. The expansion element (12) and the output coupling element (13) expand a light beam in different directions.

20 Claims, 9 Drawing Sheets

(51) Int. Cl.
  *G02B 6/00* (2006.01)
  *F21V 8/00* (2006.01)
(52) U.S. Cl.
  CPC ........ *G02B 27/0103* (2013.01); *G02B 6/0041* (2013.01); *G02B 6/0058* (2013.01); *G02B 2027/0105* (2013.01); *G02B 2027/0123* (2013.01); *G02B 2027/0125* (2013.01); *G02B 2027/0174* (2013.01)
(58) Field of Classification Search
  CPC .... G02B 2027/0118; G02B 2027/0138; G02B 27/017; G02B 2027/014; G02B 27/0093; G02B 5/30; G02B 2027/015; G02B 27/01; G02B 27/0149; G02B 2027/0123; G02B 2027/0154; G02B 2027/013; G02B 2027/0127; G02B 2027/0159; G02B 2027/011; G02B 2027/0169; G06F 3/013; G06F 3/017; G06F 1/163; G06F 3/011; G06F 3/012; G06F 3/005; G06F 3/03545; G06F 3/04883; G06F 5/10; G06F 1/203; G06F 1/206; G06F 3/016; G06F 3/0317; G06F 3/0362; G06F 3/0412; G06F 1/1632; G06F 3/014; G06F 3/0304; G06F 3/041; G06F 3/045; B60K 35/00; B60K 2370/1529; B60K 2370/66; B60K 2370/67; B60K 37/02; B60K 2370/151; B60K 2370/1531; B60K 2370/154; B60K 2370/155; B60K 2370/174; B60K 2370/177; B60K 2370/178; B60K 2370/186; B60K 2370/1868; B60K 2370/191; B60K 2370/194; B60K 2370/25; B60K 2370/334; B60K 2370/52; B60K 2370/785; G02C 11/10; G02C 2200/08; G02C 5/126; G02C 5/20; G02C 7/16; G02C 1/10; G02C 2200/06; G02C 2202/20; G02C 3/02; G02C 5/143; G02C 5/146; G02C 5/16; G02C 7/04; G02C 7/086; G02C 7/101; G02C 7/102; G02C 7/12; G02C 9/04; H04N 13/344; H04N 5/332; H04N 5/33; H04N 5/64; H04N 13/122; H04N 13/194; H04N 13/239; H04N 13/275; H04N 13/279; H04N 13/30; H04N 13/332; H04N 13/349; H04N 1/6083; H04N 2213/003; H04N 5/2252; H04N 5/7491; H04N 9/3135; H04N 9/3147; H04N 9/3155; H04N 9/3161; G09G 3/3208; G09G 2310/235; G09G 2320/0626; G09G 2340/471; G09G 2340/478; G09G 2360/144; G09G 3/2003; G09G 3/3225; G09G 3/3233; G09G 3/36; G09G 2300/478; G09G 2310/08; G09G 2320/0252; G09G 2320/041; G09G 2320/10; G09G 2340/0407; G09G 3/001; G09G 3/002; G09G 3/18; G09G 3/32
  See application file for complete search history.

(56) References Cited

U.S. PATENT DOCUMENTS

| | | | |
|---|---|---|---|
| 8,611,014 | B2 | 12/2013 | Valera et al. |
| 2003/0165017 | A1 | 9/2003 | Amitai |
| 2006/0215244 | A1* | 9/2006 | Yosha ................ G02B 27/0101 359/15 |
| 2009/0237803 | A1* | 9/2009 | Hotta ..................... G02B 3/005 359/630 |
| 2011/0304825 | A1* | 12/2011 | Sieler ................... H04N 9/3141 353/20 |
| 2013/0222384 | A1* | 8/2013 | Futterer .................. G03H 1/26 345/426 |
| 2013/0314789 | A1* | 11/2013 | Saarikko ............ G02B 27/0905 359/489.07 |
| 2013/0314793 | A1* | 11/2013 | Robbins ............. G02B 27/0172 359/573 |
| 2014/0104665 | A1 | 4/2014 | Popovich et al. |
| 2014/0140654 | A1* | 5/2014 | Brown ............... G02B 27/0172 385/10 |
| 2015/0212326 | A1* | 7/2015 | Kress ...................... G02B 3/14 349/11 |
| 2016/0018639 | A1* | 1/2016 | Spitzer ................. G02B 5/3083 345/156 |
| 2016/0041384 | A1* | 2/2016 | Robbins .................. G06F 3/013 345/156 |
| 2016/0048017 | A1 | 2/2016 | Kasahara et al. |
| 2016/0238772 | A1* | 8/2016 | Waldern ................. G02B 6/124 |
| 2017/0336222 | A1* | 11/2017 | Yamaguchi ........ G02B 27/0101 |
| 2017/0351035 | A1* | 12/2017 | Rottenberg .......... G03H 1/0465 |
| 2018/0299678 | A1* | 10/2018 | Singer ................. G02B 5/1819 |

FOREIGN PATENT DOCUMENTS

| | | |
|---|---|---|
| DE | 102013219625 B3 | 1/2015 |
| WO | 2016124713 A2 | 8/2016 |

OTHER PUBLICATIONS

Gritsai, et al., "Dye-doped PQ-PMMA Phase Holographic Materials for DFB Lasing", IOP Publishing Ltd., Journal of Optics, J. Opt. 16, 2014, 9 pages.

Mukawa, Hiroshi, et al., "Distinguished Paper: A Full Color Eyewear Display using Holographic Planar Waveguides", SID 2008, 2008 SID International Sympo, Society for Information Display, Los Angeles, USA, May 18, 2008, 4 pages.

Communication Pursuant to Article 94(3) EPC (original and English translation) issued in DE App No. 17 757 485.2-1020, dated Jun. 1, 2021.

\* cited by examiner

Fig. 17A    Fig. 17B  Fig. 17C

WAVEGUIDE AND DEVICES FOR DATA REFLECTION

The present application relates to waveguides for guiding light and to waveguide arrangements and apparatuses for data superimposition using such waveguides.

Apparatuses for data superimposition are generally used to provide data to a user. Data in this case is understood to mean any possible type of data that can be superimposed, comprising images, characters, symbols, numbers, videos or combinations thereof. Such apparatuses for data superimposition are used for example in smart glasses or head-up displays, for example in the automotive industry. Such head-up displays generally comprise an imaging unit, which can comprise for example a light source and a display, an optics module for guiding light, and a projection surface. The projection surface in this context is also referred to as a combiner. In automotive applications, such a combiner is frequently embedded in the windshield, with the result that the superimposed data can be viewed without having to look away from the road. In other variants, the combiner can be arranged separately from the windshield. Other uses comprise, for example, functional windowpanes in buses, trains or in the automotive industry or motorbike helmets.

In arrangements of this type, generally the imaging unit, for example a light-emitting diode matrix as the source and a TFT display, is used to generate an image which is projected into the field of view of the observer using one or more mirrors and possibly further optical structural elements that form the optics module and using a combiner.

Conventional arrangements predominantly utilize refractive or reflective optical structural elements for beam shaping, which results in a relatively large installation space requirement and a relatively high weight.

U.S. Pat. No. 8,611,014 B2 discloses in this respect a more compact construction using a waveguide having three diffractive relief structures, which are embedded in a transparent material. A first one of the relief structures serves for input coupling into the waveguide, a second one of the relief structures serves for beam expansion, and a third one of the relief structures serves for output coupling. Disadvantages of this solution are the limitation to one wavelength and the technologically challenging embedding and replication of the relief structures. However, relief structures without embedding are not recommended due to the sensitive structures.

"A full-color eyewear display using planar waveguides with reflection volume holograms," Hiroshi Mukawa et al., Journal of the Society for Information Display, Vol. 17, Ed. 3, pages 185-193, March 2009, discloses a one-dimensional waveguide with volume holograms. Beam expansion does not take place in this waveguide.

US 2014/0104665 A1 discloses a waveguide in one direction with an input coupling structure and an output coupling structure, wherein layer stacks for different wavelengths can be provided.

A further waveguide structure for a plurality of different wavelengths is also known from US 2013/0314789 A1, wherein embedded microstructures are likewise used.

It is an object to provide waveguides and apparatuses for data superimposition using such waveguides, in which the abovementioned disadvantages are at least partially alleviated or eliminated. In addition, there is a demand for increased flexibility of the use of such waveguides.

Provided are a waveguide as per claim 1, a waveguide arrangement as per claim 14, and an apparatus for data superimposition using such a waveguide as per claim 16. The dependent claims further define embodiments.

According to a first aspect, a waveguide is provided, comprising:

a first diffractive structure for receiving light and for diffracting the light into the waveguide at an angle greater than the angle of total internal reflection of the waveguide, and a second diffractive structure for expanding the light in the waveguide and for diffracting the light in the waveguide for coupling the light out of the waveguide.

This allows the provision of a compact waveguide.

Preferably, the first diffractive structure comprises a first volume holographic grating, and the second diffractive structure comprises a second volume holographic grating.

The waveguide can further comprise a third diffractive structure, wherein the first diffractive structure is configured to diffract the light in the direction of the third diffractive structure into the waveguide, wherein the third diffractive structure is arranged to expand the light in the waveguide in a first direction and to diffract the light in the direction of the second diffractive structure, and wherein the second diffractive structure is configured to expand the light in a second direction, which is substantially perpendicular to the first direction.

The third diffractive structure can comprise a volume holographic grating.

Volume holographic gratings are here gratings which are implemented in the form of volume holograms. It is possible by using three such volume holograms to effectively achieve beam expansion. A volume hologram is a hologram which is generally produced in a light-sensitive volume material by way of light exposure and development. First, a master can be obtained by exposure to two or more coherent light waves, and subsequent duplicates can be produced by contact replication.

The third diffractive structure can have an efficiency that varies in the first direction, and the second diffractive structure can have an efficiency that varies in the second direction. In this way, uniform beam expansion can be attained.

The first diffractive structure, the second diffractive structure and/or the third diffractive structure can be embodied in the form of reflection gratings.

The second diffractive structure can have a spatially varying efficiency for attaining uniform beam expansion.

The first diffractive structure, the second diffractive structure and/or the third diffractive structure can be wavelength-selective.

In particular, the first diffractive structure, the second diffractive structure and/or the third diffractive structure can each comprise a first partial structure, which is sensitive for a first group of wavelengths, and a second diffractive partial structure, which is sensitive for a second group of wavelengths, with the first group of wavelengths differing from the second group of wavelengths. In this way, different color channels can be guided and expanded independently of the waveguide.

The first group of wavelengths and the second group of wavelengths can in each case have a wavelength in the red, green and blue spectral range.

The first partial structure can in each case be arranged above the second partial structure.

The second diffractive structure can be configured to couple out the first group of wavelengths in a different direction than the second group of wavelengths. In this way, an eyebox can be increased.

The second diffractive structure can have imaging properties. For example, it is possible to ensure desired imaging simultaneously with the beam expansion.

Provided in addition is a waveguide arrangement having a waveguide as described above, furthermore comprising an adaptation optical unit, which is configured to receive the light that is coupled out of the waveguide.

The adaptation optical unit can comprise a lens element, a Fresnel element, a Fresnel plate, an adjustable optical unit or an Alvarez lens element.

It is possible by using an adjustable optical unit to flexibly use the waveguide arrangement.

In accordance with a second aspect, an apparatus for data superimposition is provided, comprising:

an imaging device for generating a light beam modulated data to be presented, and a waveguide or a waveguide arrangement as described above, which is arranged to receive the light beam at the first diffractive structure.

The apparatus can furthermore comprise a combiner, which is arranged to receive the light that is coupled out of the waveguide.

The invention will be explained in more detail below on the basis of various exemplary embodiments. In the figures.

Various exemplary embodiments are explained in detail below. This explanation serves merely for illustration and should not be interpreted as restrictive. By way of example, a description of an exemplary embodiment with a multiplicity of features or elements should not be interpreted to the effect that all these features and elements are necessary for implementation. Rather, some of these elements or features may also be omitted and/or replaced by alternative features or elements in other exemplary embodiments. Further features or elements can also be provided in addition to the explicitly illustrated or presented features and elements, for example elements used in conventional apparatuses for data superimposition.

Elements of different exemplary embodiments can be combined with one another, unless indicated otherwise. Variations or modifications which are described for one of the exemplary embodiments may also be applied to other exemplary embodiments.

First, a first exemplary embodiment of a waveguide is illustrated with reference to FIGS. 1-4.

FIGS. 1-4 here show different views of a waveguide 10 in accordance with an exemplary embodiment. A coordinate system 14 in FIGS. 1-4 serves for orientation.

The waveguide 10 comprises a transparent material, for example glass, polymethyl methacrylate (PMMA) or the like, having at least three embedded volume holograms 11, 12 and 13. Volume holograms comprise volume holographic layers in which phase gratings are introduced by exposure to light by way of local modulation of the refractive index. Volume holograms here function wavelength-selectively and angle-selectively. That means that in particular light of a specific operating wavelength can be diffracted by a specific angle (design angle). In order to produce a waveguide for different wavelengths, it is possible to write for example for different wavelengths in each case one grating into the same volume holographic layer. For example, for a blue, a red and a green wavelength, in each case one volume holographic grating can be written into the layer. Each grating can here be written for the same angle of incidence and diffraction angle, with the result that light of all wavelengths for which the volume holographic grating is designed is diffracted into the same direction. This wavelength-selective effect is more pronounced in volume holographic reflection gratings than in volume holographic transmission gratings.

Materials that can be used for the volume holographic layers are in principle all suitable photorefractive materials, for example photopolymers, photorefractive glasses or specially doped plastics such as for example PMMA-based plastics, as described in Y. Gritsai et al. "Dye-doped PQ-PMMA phase holographic materials for DFB lasing," Journal of Optics, Vol. 16.

The waveguide 10 comprises in particular a volume holographic input coupling grating 10, a volume holographic expander grating 12 for beam expansion, and a volume holographic output coupling grating 13. The function of these three volume holographic gratings will be explained in more detail below with reference to FIGS. 2-4.

Figure 1:
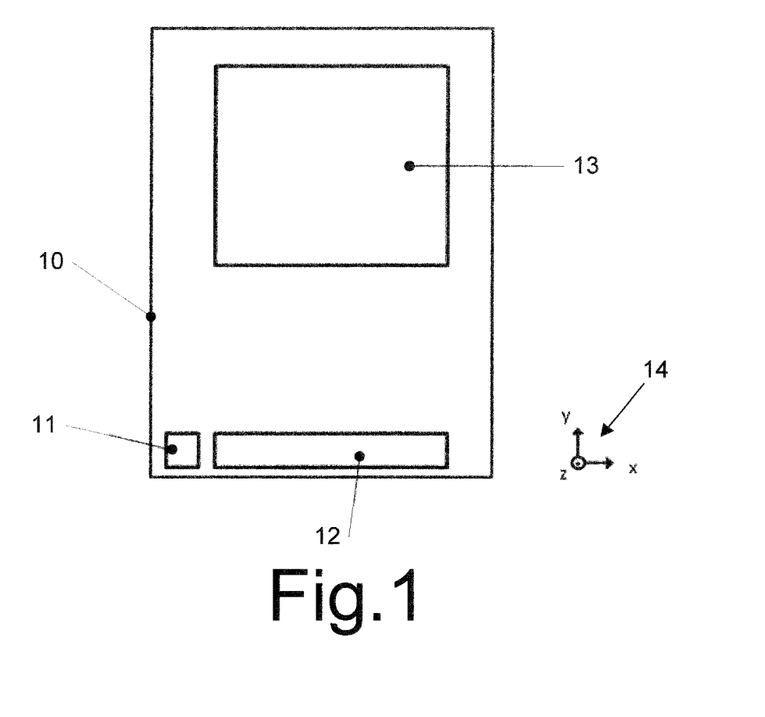
FIG. 1 shows a plan view of a waveguide according to an exemplary embodiment.
Figure 2:
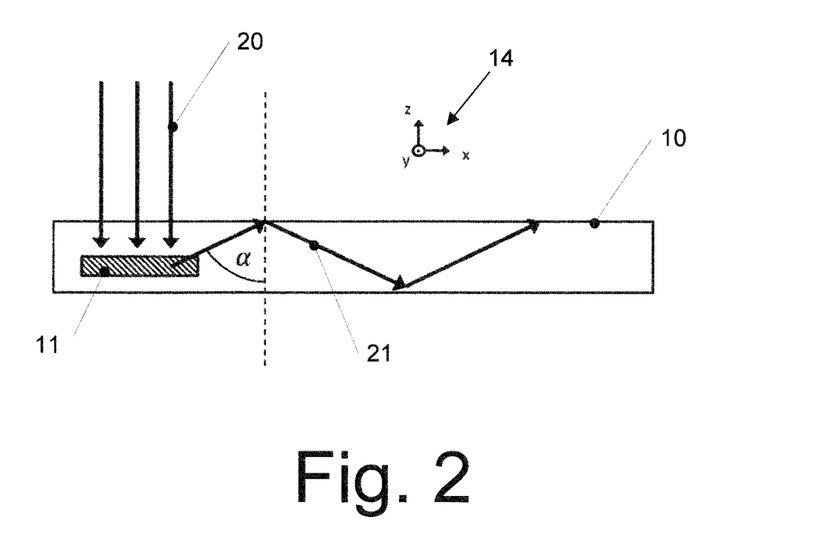
FIG. 2 shows a partial cross-sectional view of the waveguide from FIG. 1.

FIG. 2 shows a partial cross-sectional view of the waveguide 10 with the input coupling grating 11. The input coupling grating 11 is here in the form of a reflection hologram and is embedded in the transparent material of the waveguide 10. Light beams 20 that are incident in the z-direction on the input coupling grating 11 are diffracted at an angle α. The angle α is greater than the angle of total internal reflection of the waveguide 10, which is obtained from the refraction difference between the waveguide material of the waveguide 10 and the refractive index of the surrounding medium (for example air or an embedding material). The light beams 20 can be present here in particular in the form of a collimated plane wave. The input coupling grating (11, 11A, 11B) does not necessarily have to diffract a plane wave as light beam 20, 20A, 20B, but can for example also be configured to diffract a divergent wave, which is produced for example by an imaging device, as a plane wave in the direction of the expander grating.

Consequently, the diffracted light beams are totally internally reflected as light beams 21 and expand in the x-direction with respect to the expander grating 12. The function of the expander grating 12 is depicted in FIG. 3.

Figure 3:
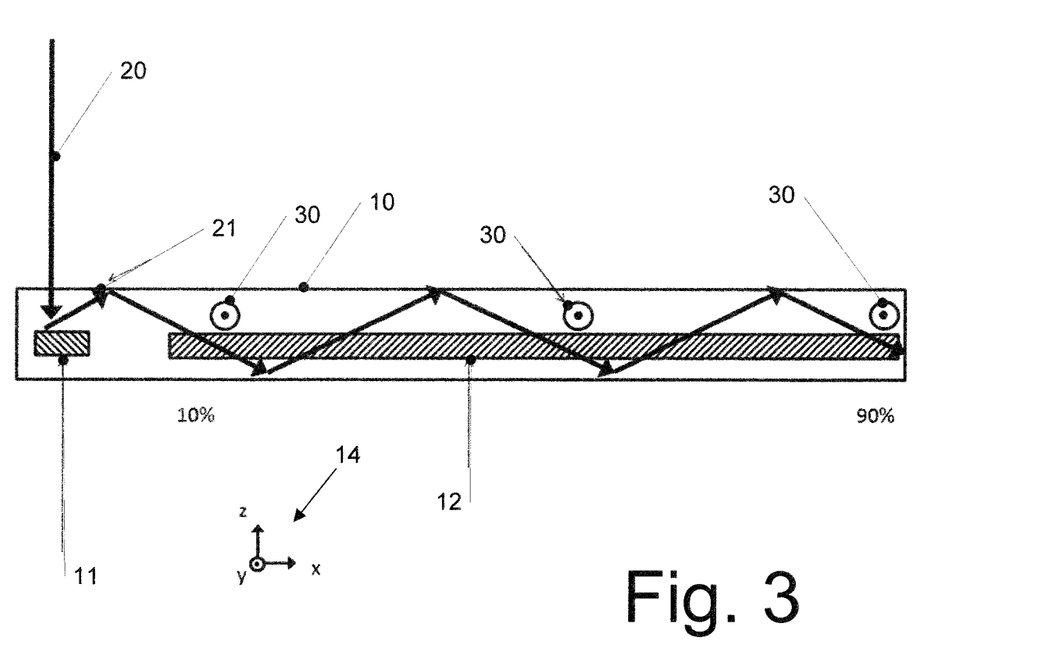
FIG. 3 shows a cross-sectional view of the waveguide from FIG. 1.

The expander grating diffracts the light toward the y-direction as indicated by light beams 30 in FIG. 3, wherein the angle is again greater than the angle of total internal reflection, for example greater than 60°. The expander grating here has an efficiency profile with increasing efficiency in the x-direction, for example from 10% to 90%, as indicated in FIG. 3. The efficiency refers to the portion of the incident light that is actually diffracted, while the rest of the light passes through the expander grating 12. This has the effect that, as indicated in FIG. 3, the light beam 21 is diffracted in a manner distributed over the entire length of the expander grating 12, which effectively results in a beam expansion in the x-direction. The grating structure of the expander grating 12 here does not change in the x-direction, and the profile of the efficiency is achieved via a profile of the refractive index modulation. At the beginning of the grating 12, viewed in the x-direction, the refractive index modulation is low, and greater at the end. This behavior can be set during the holographic exposure process of the expander grating 12, for example by way of an exposure intensity (dose) that increases in the x-direction, i.e., the exposure index intensity is lowest on the side of the input coupling grating.

The expander grating 12 here expands the wave in one direction and is therefore also referred to as 1D beam expander.

Figure 4:
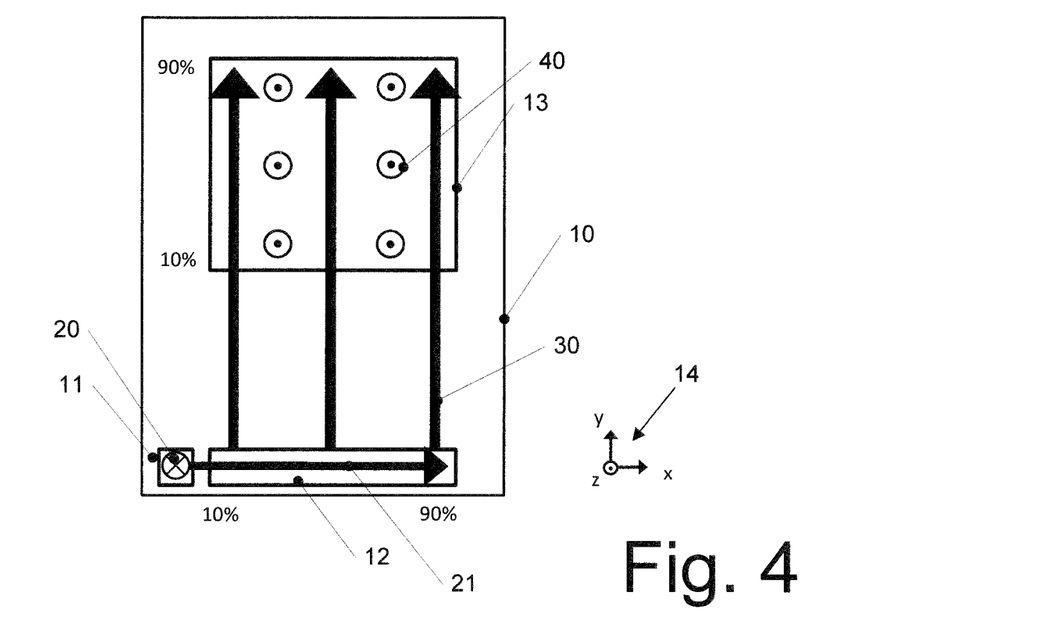
FIG. 4 shows a plan view of the waveguide from FIG. 1.

As is shown in FIG. 4, the expanded light is thus directed to the output coupling grating 13 as per the light beams 30. The output coupling grating 13 is again arranged as a volume holographic layer in the transparent material of the waveguide 10 and diffracts the light beams 30 in the z-direction, such that they are coupled out of the waveguide 10, since the diffraction angle is below the angle for total internal reflection and is for example 0° (perpendicular exit from the waveguide 10). The efficiency of the output coupling grating 13 here increases in the y-direction, for example from 10% to 90%, with the result that the beam is expanded in the y-direction after it was expanded by the expander grating 12 in the x-direction. This produces a two-dimensional expansion of the beam.

In other words, the coupled-in light 20 can be expanded in this way in two directions and be coupled out again by the output coupling grating 13 as a plane wave with a uniform homogeneous efficiency over the surface of the output coupling grating 13. As already mentioned, the gratings 11, 12 and 13 in the exemplary embodiment of FIGS. 1-4 are embodied in the form of volume holographic reflection gratings. The angle and wavelength selectivity can be influenced in a targeted manner by way of the thickness of the gratings. With a constant thickness of the gratings, the set refractive index modulation determines (for example by way of the dose of the exposure) the diffraction efficiency of the grating for a specific wavelength. The input coupling grating 11 can here exhibit a diffraction efficiency that is homogeneous over the surface thereof, in particular a diffraction efficiency that is as high as possible, because it is the task of the input coupling grating 11 to efficiently diffract the light beam 20 by an angle that is of such a magnitude that waveguiding is ensured by total internal reflection in the waveguide 10.

The gratings 12, 13, on the other hand, in the exemplary embodiment of FIGS. 1-4 have a profile of the diffraction efficiency, which is preferably set by the illumination intensity (dose) during the exposure of the grating. The greater the exposure intensity, or the dose, during the recording of the volume holographic reflection grating, the greater the refractive index modulation. In this way it is possible, while otherwise keeping geometric conditions such as diffraction angle, grating constant and grating thickness unchanged, to produce in a targeted fashion regions of different diffraction efficiency. The holographic gratings 11-13 can in particular be embodied in the form of what are known as plane-to-plane gratings, i.e., they diffract a plane wave by a respectively constant angle.

The use of plane-to-plane gratings here has the advantage that the corresponding photosensitive material can be structured with (exposed to) a specific wavelength $\lambda_1$ but can later be read, i.e., used, with a different wavelength $\lambda_2$. When using RGB-sensitive (RGB=red, green, blue) photopolymer, exposure can occur for example for a waveguide that operates at $\lambda_2$=520 nm with $\lambda_1$=532 nm. By contrast, photosensitive glasses can be exposed for example with $\lambda_1$=325 nm, even if they are specified for reproduction with 638 nm. Other wavelength combinations are likewise possible. This method is possible in particular in plane-to-plane gratings. When using spherical waves rather than plane waves, by contrast, aberrations would occur without the use of correction elements.

In the exemplary embodiment of FIGS. 1-4, the light is coupled out by the output coupling grating 13 in the z-direction as a plane wave. In other exemplary embodiments, the output coupling grating 13 can also be embodied with an imaging function as a holographic lens element. In this way, imaging can be produced without a further optical unit being necessary.

The waveguide 10 of FIGS. 1-4 can be embodied in the form of a monochromatic waveguide or a polychromatic waveguide, i.e., the volume holographic gratings 11-13 can be designed for a single wavelength or for a plurality of wavelengths. In particular, a design for three wavelengths, one in the red range, one in the green range and one in the blue range, can be effected in order to enable in this way the transfer of RGB color information in the waveguide. In such a case, the reflection gratings comprise in each case a grating for green (532 nm), a grating for red (e.g., 647 nm), and a grating for blue (e.g., 460 nm), which can be introduced by exposure into the same volume holographic layer. When using a corresponding narrowband imaging device, with such imaging devices being commercially available, each grating is "seen" only by the respective wavelength, without crosstalk between the color channels taking place.

The exemplary embodiment of FIGS. 1-4 can be used in particular in apparatuses for data superimposition. In this case, the light beams 20 contain image information which is expanded by the waveguide and can then be projected for example onto a combiner. Examples of imaging devices that can be used together with the waveguide 10 to form an apparatus for data superposition are illustrated in FIGS. 5 and 6.

Figure 5:
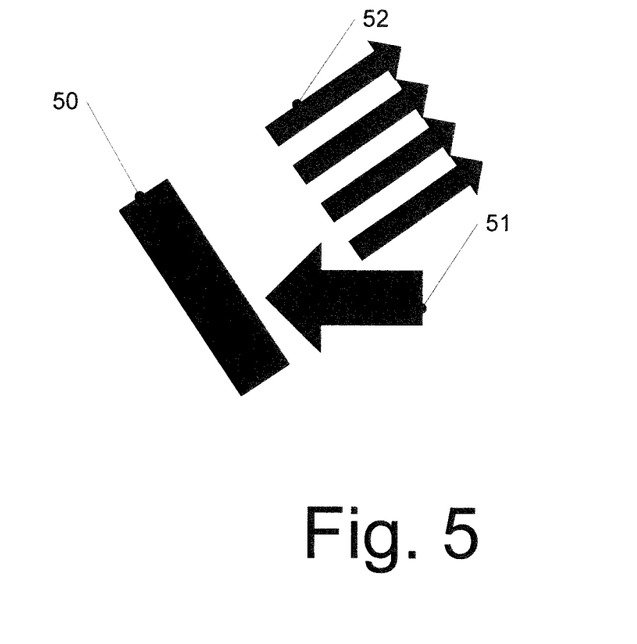
FIG. 5 shows a schematic illustration of an apparatus with the waveguide from FIGS. 1-4.

In the exemplary embodiment of FIG. 5, a collimated light wave 51 is directed onto an imaging device 50. The imaging device 50 can comprise for example a micromirror device (DMD, digital mirror device) or an LCoS arrangement (liquid crystal on silicon). This produces a collimated wave 52 that is modulated in accordance with the image information and can then be coupled into the waveguide 10 as light beam 20.

Figure 6:
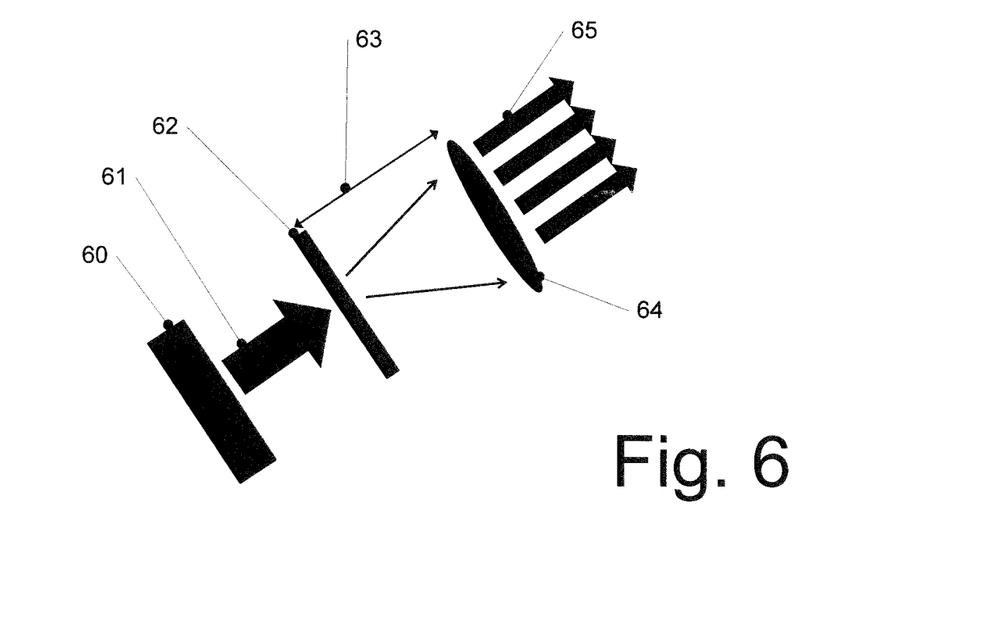
FIG. 6 shows a further schematic illustration of an apparatus with the waveguide from FIGS. 1-4.

Another possibility is illustrated in FIG. 6. Here, an intermediate image is produced on a diffusing plate 62 by illuminating the diffusing plate 62 with corresponding light 61 from an imaging device 60, for example a micromirror device, an LCoS arrangement, a TFT display or the like. Using a collimation optical unit 64, which is arranged at a distance of a focal length 63 of the collimation optical unit 64 from the diffusing plate 62, a collimated light beam 65 with the image information is produced, which can in turn be coupled into the waveguide 10 as a light beam 20.

Figure 7:
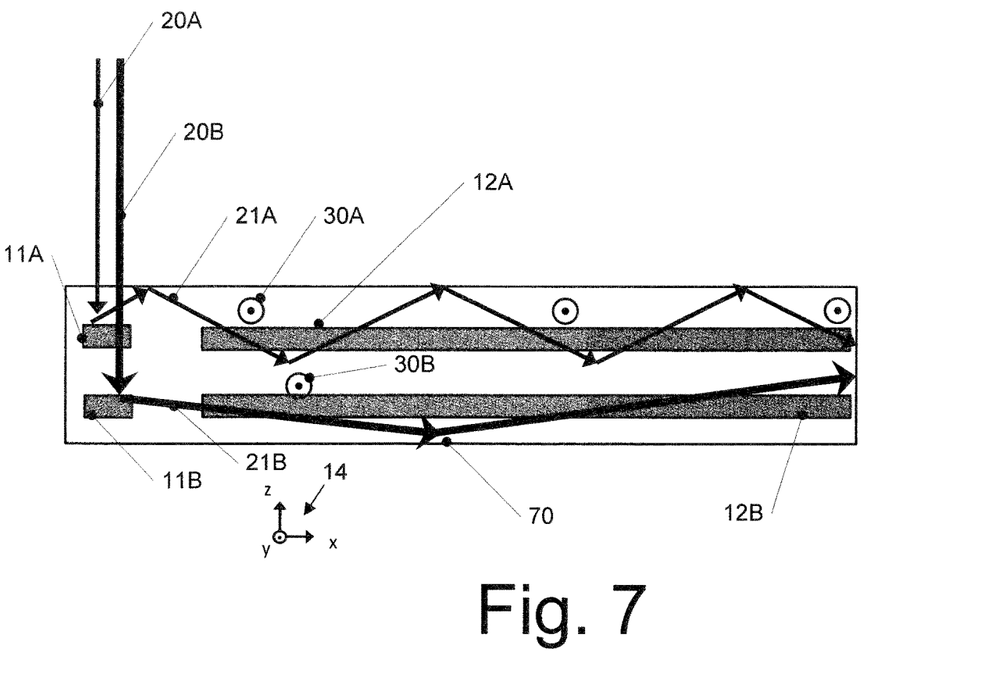
FIG. 7 shows a cross-sectional view of a waveguide according to a further exemplary embodiment.

In the exemplary embodiment of FIGS. 1-4, the gratings have in each case a single holographic layer. However, a plurality of holographic layers can also be used, whereby light of different wavelengths can be expanded separately. An exemplary embodiment for this is shown in FIG. 7. FIG. 7 shows here in particular a cross-sectional view corresponding to the view of FIG. 3. To avoid repetition, reference is made to FIGS. 1-4 when describing the exemplary embodiment of FIG. 7.

FIG. 7 illustrates a waveguide 70, which, like the waveguide 10, consists of a transparent material. Arranged in the waveguide 7 are input coupling grating, expander grating and output coupling grating, corresponding to the gratings of the waveguide 10, in two layers. FIG. 7 shows, in a first layer, an input coupling grating 11A and an expander grating 12A, and, in a second layer, an input coupling grating 11B and an expander grating 12B. Additionally provided in the waveguide 70 are also respective output coupling gratings (not illustrated).

The layers can here be designed for different wavelengths and have different diffraction angles. In the exemplary embodiment of FIG. 7, for example the input coupling grating 11A, the expander grating 12A and the associated output coupling grating can be designed for three wavelengths of 442 nm (blue), 514 nm (green) and 638 nm (red), and the input coupling grating 11A can have a diffraction angle of 60°, for example. As a result, a light beam 12A, for example collimated light, having these wavelengths is diffracted as light beam 21A by the input coupling grating 11A and then expanded and diffracted by the expander grating 12A as light beam 30A. With respect to the efficiency profile, what was described with reference to FIGS. 1-4 applies to the expander gratings 12A, 12B and to the corresponding output coupling gratings.

By contrast, the input coupling grating 11B, the expander grating 12B and the corresponding output coupling grating can for example be designed for wavelengths of 460 nm (blue), 532 nm (green) and 660 nm (red) and have a diffraction angle of 70°. In this way, light having these wavelengths corresponding to a light beam 20B, for example a plane wave, is diffracted by the input coupling grating 11B as light beam 21B and diffracted by the expander grating 12B as further light beam 30B. Since volume holograms are strongly wavelength-selective, the two channels are separated, i.e., the gratings 11A, 12A substantially do not influence the light beams 20A, 21B, 30B, and the gratings 11B, 12B substantially do not influence the light beams 20B, 21B, 30A. The image information can then be imaged differently by an output coupling grating with imaging function or be imaged by further wavelength-selective holograms arranged outside the waveguide 70 further for example in different planes as a virtual or real image for observation by a user.

It should be noted that the separation of the color channels illustrated in FIG. 7 does not necessarily have to be done via spatially separate holographic layers. It is also possible for a plurality of channels to be separately introduced in the same holographic layer by way of exposure, similar to the above-described exposure for a plurality of colors in one layer. By using different diffraction angles, crosstalk between the channels is here reduced.

In addition, more than two layers, for example three or more layers, can also be used.

Embodiments for different wavelengths and with different angles can also be used to realize a large eyebox, i.e., a large region in an apparatus for data superimposition, in which data that are to be superimposed can be observed. For example, for three directions in each case one output coupling grating can be introduced by exposure into a corresponding volume holographic layer, for example obliquely left, perpendicular and obliquely right, resulting in an expansion of the eyebox. This can be done for different wavelengths.

The output coupling grating or gratings can have imaging properties, as already mentioned, for example corresponding to a spherical lens element. This can allow not only virtual imaging (creation of a virtual image), but also the creation of a real image in front of the waveguide, which makes possible use as a holographic projection system for real projections in space.

In addition, different input coupling gratings can also be arranged at different places in the x-y-plane, i.e., the arrangement does not have to be one on top of the other, as in FIG. 7. Generally, the arrangement illustrated of input coupling grating, expander grating and output coupling grating should be understood to be merely an example, and other arrangements are also possible.

The waveguides described are based on the total internal reflection of the light beams guided in a zigzag at the interface between waveguide and surrounding medium, for example air. The surrounding medium, however, does not necessarily have to be air. The waveguide can also be embedded in a material having a lower refractive index than the refractive index of the waveguide. For example, the waveguide can be made from BK7 glass, which has a refractive index of n=1.518, and can be embedded in quartz glass having a refractive index n=1.46, wherein a diffraction angle of 80° can be used.

In this way, it is possible using volume gratings to compactly realize polychromatically beam expansion and, if required, also virtual or real imaging, possibly in different planes.

Figure 8:
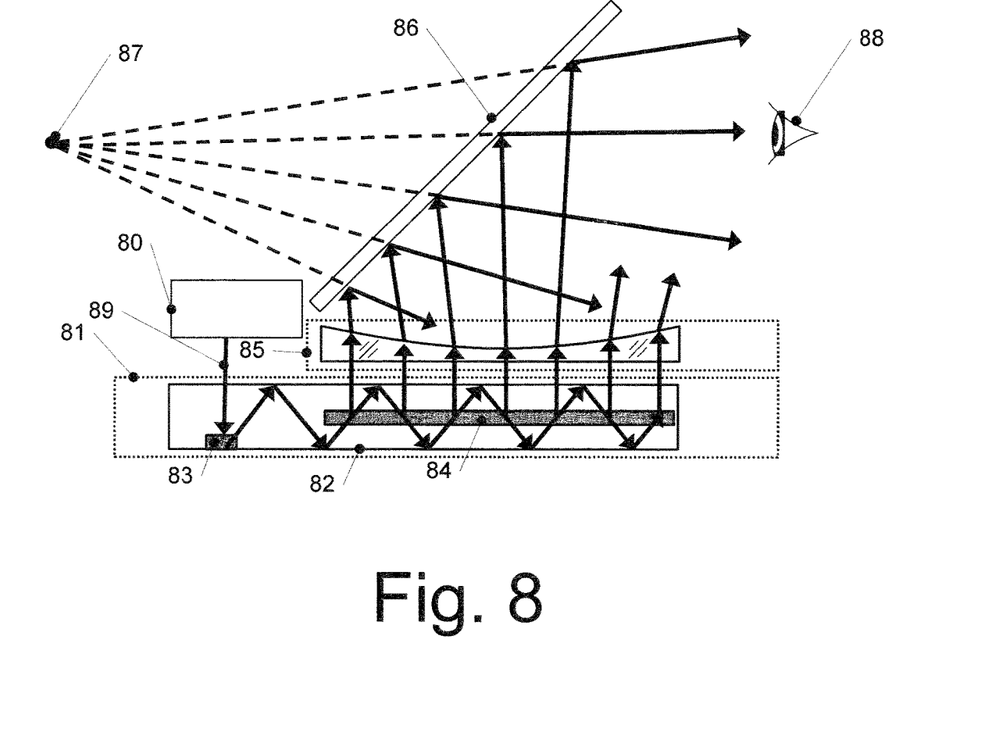
FIG. 8 shows an illustration of an apparatus for data superimposition in accordance with an exemplary embodiment.

FIG. 8 illustrates a further apparatus for data superimposition. The apparatus in FIG. 8 comprises an imaging device 80. The imaging device 80 can be embodied as explained with reference to FIGS. 5 and 6, i.e., it can use a micromirror device, an LCoS arrangement or the like.

Light from the imaging device 80, in particular collimated light, is fed, as light beam 89, to an expansion module 81 having a waveguide 82. In some exemplary embodiments, the waveguide 82 can be embodied according to the waveguide 10 of FIGS. 1-4 or according to the waveguide 70 in FIG. 7. In the illustrated exemplary embodiment, the waveguide 82 has an input coupling grating 83 and an output coupling grating 84, wherein the output coupling grating 84 performs beam expansion at the same time and thus serves as an expander grating. The gratings 83, 84 can be implemented as volume holograms, but can also be implemented by way of other diffractive structures, for example as surface gratings or as gratings embedded between two plates, as illustrated in FIG. 8.

The light expanded and coupled out by the output coupling grating 84 is fed to an adaptation optical unit 85, which is illustrated in the exemplary embodiment of FIG. 8 as a lens element and adapts the coupled-out light to a concrete projection task, here projection onto a combiner 86. The combiner 86 can be a separate combiner or a windshield or a visor of a motorbike helmet or the like. In the exemplary embodiment illustrated, the adaptation optical unit 85 is an imaging optical unit such that a virtual image 87 of the data that are to be superimposed is observable by an observer 88. In other exemplary embodiments, adaptation optical units for creating real images can also be used. In the exemplary embodiment of FIG. 8, the adaptation optical unit 85 comprises a spherical or aspheric lens optical unit. Other options for the adaptation optical unit 85 will be explained below. The adaptation optical unit 85 can here be mounted directly on the waveguide 82, wherein in this case a corresponding refractive index difference for correct waveguiding between adaptation optical unit and waveguide needs to be provided, for example by using different glasses having different refractive indices.

Figure 9:
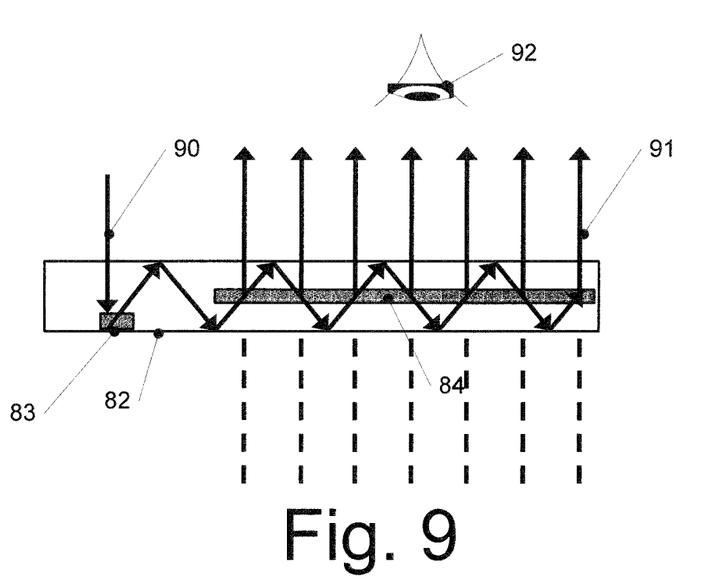
FIG. 9 shows an illustration of a waveguide according to an exemplary embodiment.
Figure 10:
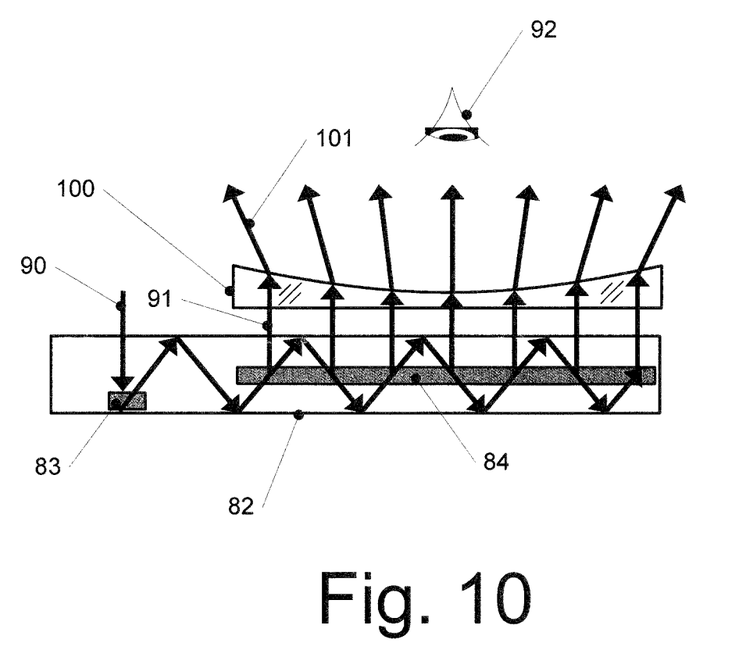
FIG. 10 shows an illustration of a waveguide apparatus according to an exemplary embodiment.

FIGS. 9 and 10 show details of the exemplary embodiment of FIG. 8 with further explanations.

FIG. 9 illustrates in enlarged form the waveguide 82 with the input coupling grating 83 and the output coupling grating 84. A beam 90 that is to be coupled in, for example by the imaging device 80 of FIG. 8, is diffracted by the input coupling grating 83 such that total internal reflection occurs, as has already been described with reference to FIGS. 1-4. The input coupling grating 83 can here be, as has also already been described, wavelength-selective and angle-selective and be designed for one or more wavelengths. The output coupling grating 84 expands the light beam and couples in each case part of the light beam out as coupled-out light beam 91 to permit observation by an observer 92. As already explained, the output coupling grating 84 can in this respect have an efficiency profile. It is also possible, as in the exemplary embodiment of FIGS. 1-4, for a further expander grating to be provided to permit expansion in two directions.

FIG. 10 illustrates the waveguide 82 of FIG. 9 together with a lens element 100 as an example of an adaptation optical unit. The lens element 100 produces from the coupled-out light beam 91 a light beam 101, which, in the exemplary embodiment of FIG. 10, is a divergent light beam, in order to produce a virtual image for the observer 92.

Variations of the exemplary embodiments of FIGS. 8-10 will now be explained with reference to FIGS. 11-17. In order to avoid repetition, identical or mutually corresponding elements will bear the same reference signs and will not be explained again in detail.

Figure 11:
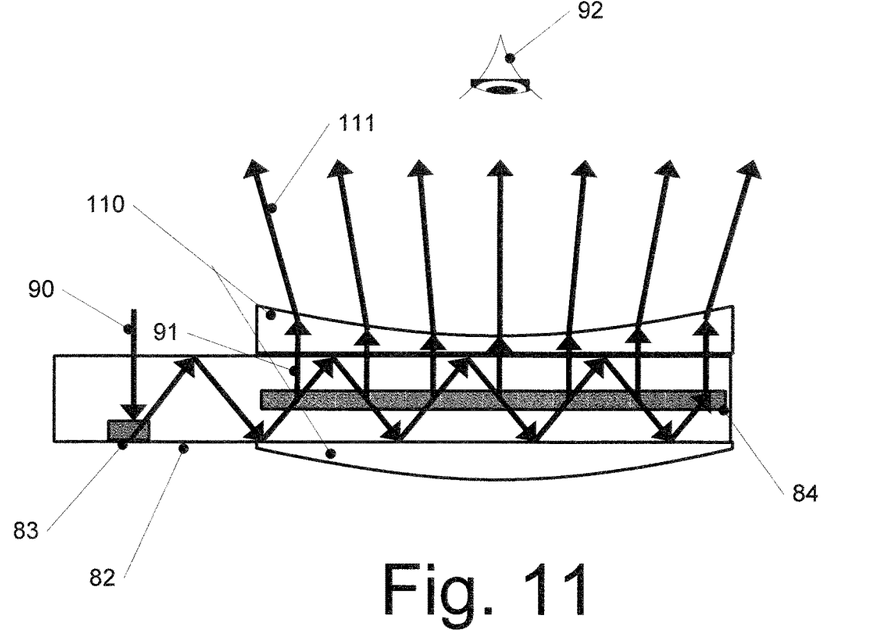
FIG. 11 shows an illustration of a waveguide arrangement according to a further exemplary embodiment.

FIG. 11 shows a variation of FIG. 10, in which the waveguide 82 is embedded in a spherical optical unit 110, with the spherical optical unit 110 overall being a nonimaging optical unit. As a result, it is possible for an image at a finite distance to be produced for the observer 92 by the light beams 111 deflected by the optical unit 110.

Figure 12:
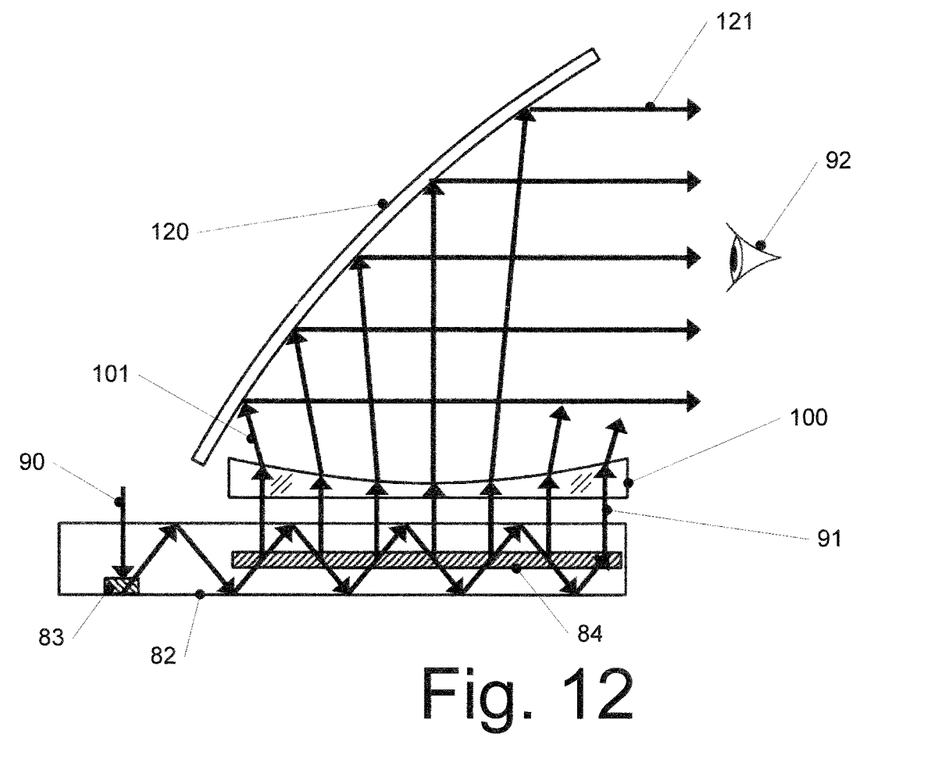
FIG. 12 shows an illustration of an apparatus for data superimposition in accordance with an exemplary embodiment.

FIG. 12 shows a variation of FIG. 8, wherein the lens element 100 of FIG. 10 is used as the adaptation optical unit 85 and a curved surface 120, for example a windshield, is used as a combiner so as to guide light beams 121 to the observer 92. In the illustrated example, the light beams 121 are parallel, which corresponds to a virtual image at infinity.

In this way, virtual images can be produced both at a finite distance, as in FIG. 8, or at infinite distance, as in FIG. 12.

Figure 13:
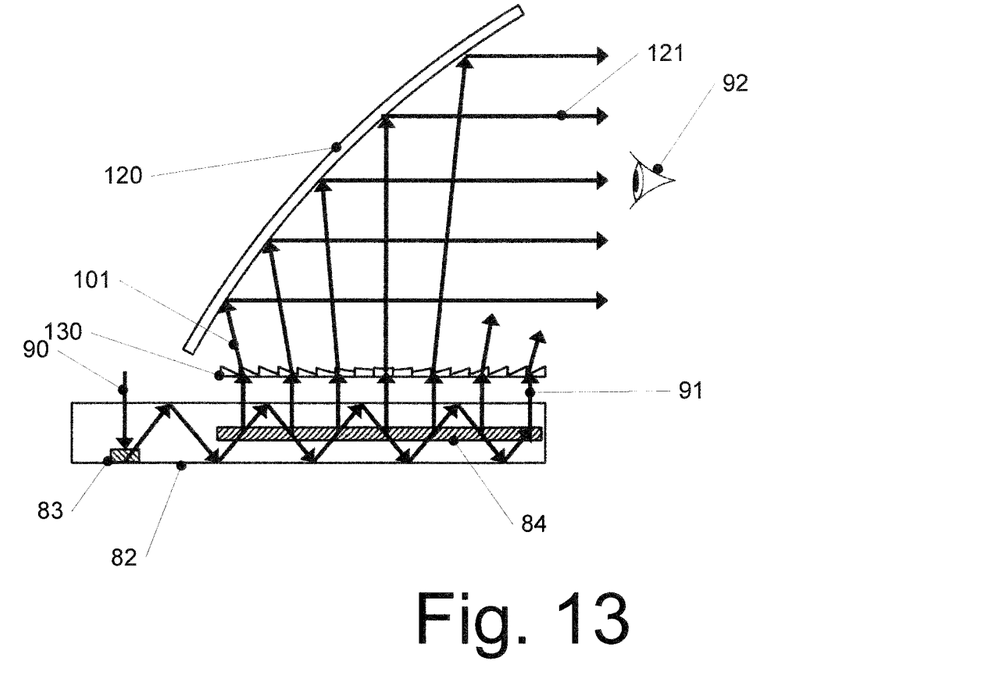
FIG. 13 shows an illustration of an apparatus for data superimposition in accordance with a further exemplary embodiment.

FIG. 13 shows a modification of FIG. 12, in which, instead of the lens element 100, a Fresnel lens element 130 is provided, which substantially has the same optical function as the lens element 100 of FIG. 12. Even using the Fresnel lens element 130 it is possible to provide a virtual image at infinity or at a finite distance for the observer 92.

Figure 14:
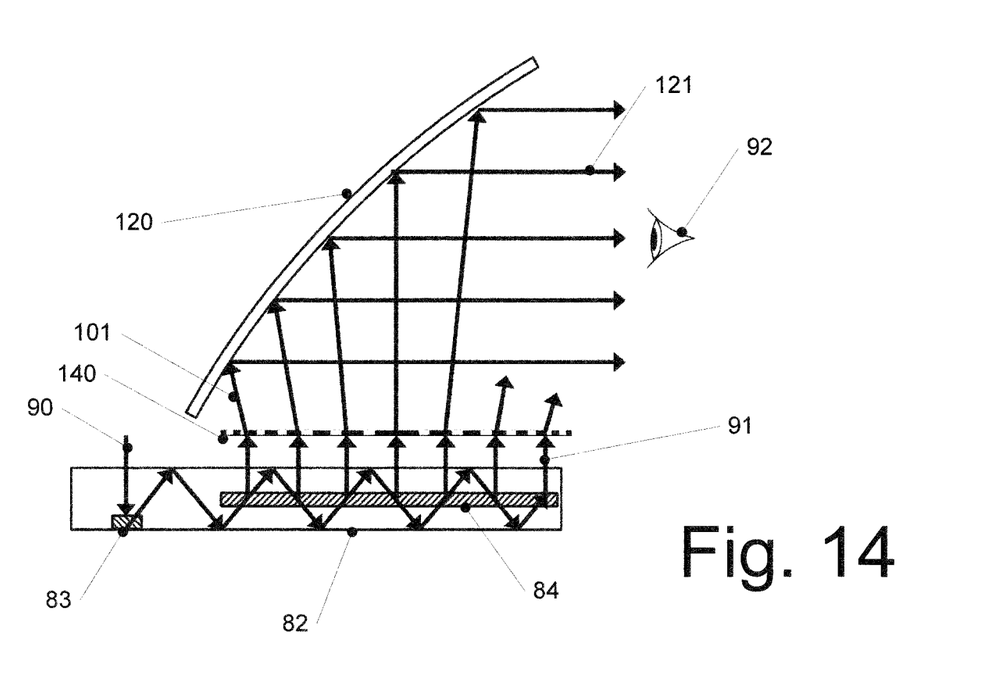
FIG. 14 shows an illustration of an apparatus for data superimposition in accordance with a further exemplary embodiment.

A further variant is depicted in FIG. 14. In the exemplary embodiment of FIG. 14, provided instead of the lens element 120 of FIG. 12, is a Fresnel zone plate 140 which has substantially the same optical function and likewise effects production of a virtual image at infinity or at a finite distance.

Figure 15:
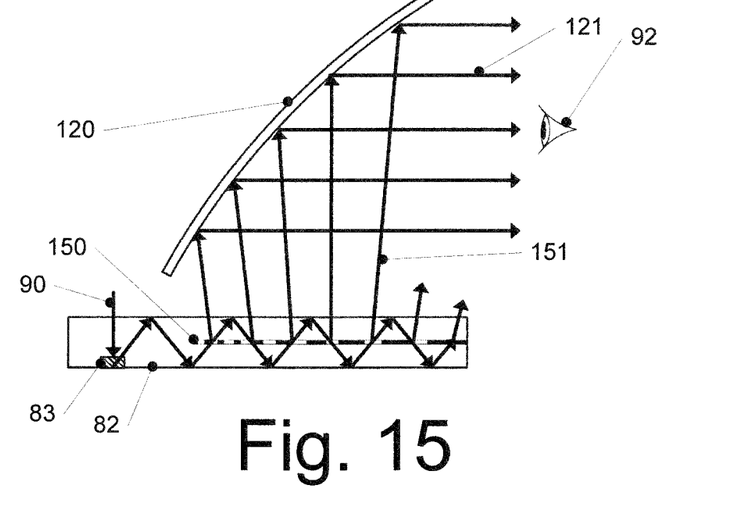
FIG. 15 shows an illustration of an apparatus for data superimposition in accordance with a further exemplary embodiment.

A further exemplary embodiment is illustrated in FIG. 15. In the exemplary embodiment of FIG. 15, no adaptation optical unit that is separate from the waveguide 82 is provided, but rather, the waveguide 82 has an imaging grating 150 for coupling out, for example a holographic grating and/or diffractive structures which not only couple light out of the waveguide but also image beams 15 in accordance with an optical function, for example corresponding to the lens element 120, for the observer 92.

Figure 16:
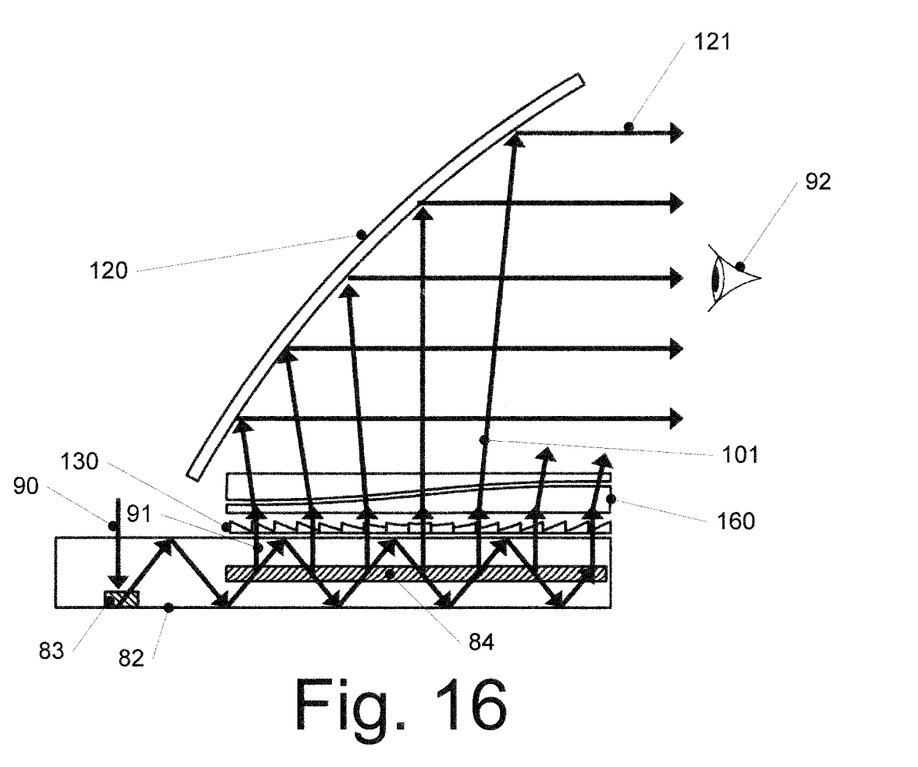
FIG. 16 shows an illustration of an apparatus for data superimposition in accordance with a further exemplary embodiment.
Figures 17A, 17B, 17C:
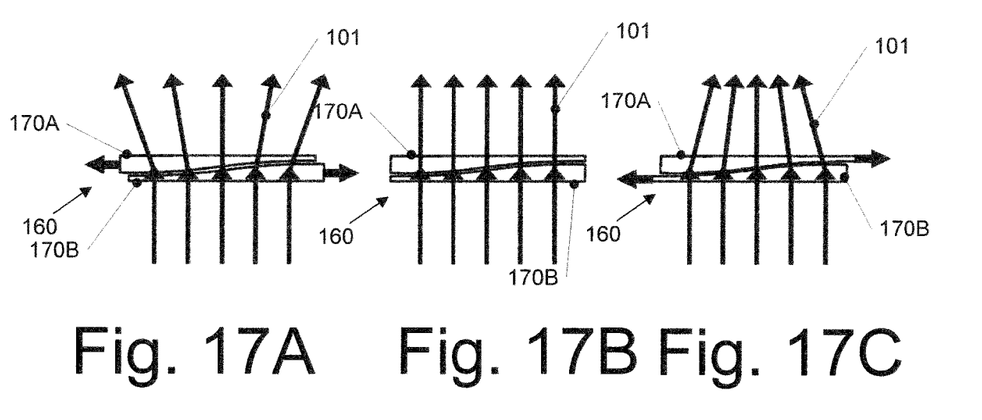
FIGS. 17A-17C show illustrations for explaining an adjustable optical unit of the exemplary embodiment of FIG. 16.

A further exemplary embodiment is illustrated in FIG. 16, which is based on the exemplary embodiment of FIG. 13. In addition to the Fresnel lens element 130, a variable optical unit 160 in the form of an Alvarez lens element is provided here, by means of which the focal length of the entire optical unit 130, 160 is adjustable. In other exemplary embodiments, the Fresnel element 130 can also be substituted by a conventional lens element or by a Fresnel plate, as in FIG. 12 or 14, or be omitted entirely, which means that the Alvarez lens element 160 constitutes the only optical element of the adaptation optical unit. It is also possible, instead of an Alvarez lens element, to provide other variable optical units, for example a liquid-crystal lens element. The effect of the Fresnel lens element 160 is illustrated in FIGS. 17A-17C. As illustrated in the FIGS. 17A-17C, the Alvarez lens element 160 has two optics components 170A, 170B which are displaceable with respect to one another so as to change the optical effect of the Alvarez lens element 160. This brings about a diffusing effect in the position of the components 170A, 170B in FIG. 17A, substantially no effect in the position of FIG. 17B, i.e., the light beams simply pass through the Alvarez lens element 160, and a focusing effect in the position of FIG. 17C. In this way, for example the distance of a virtual image from the observer can be set.

In view of the multitude of variations and modifications, it is clear that the exemplary embodiments illustrated above should not be construed as limiting.

The invention claimed is:

1. An apparatus for data superimposition, comprising:
   an imaging device for generating a light beam modulated according to data to be presented;
   a waveguide comprising:
      a first diffractive structure for receiving the light beam and for diffracting the light beam into the waveguide at an angle greater than the angle of total internal reflection of the waveguide, and
      a second diffractive structure for expanding the light in the waveguide and for diffracting the light in the waveguide, for coupling the light out of the waveguide;
   an adaptation optical unit which is provided in a light path of the light that is coupled out of the waveguide, the adaptation optical unit having an adjustable focal length and outputting at least a portion of the light received from the waveguide; and a combiner which is arranged to receive the light output from the adaptation optical unit.

2. The apparatus of claim 1, wherein the adaptation optical unit comprises a variable optic providing the adjustable focal length.

3. The apparatus of claim 1, wherein the first diffractive structure comprises a first volume holographic grating and the second diffractive structure comprises a second volume holographic grating.

4. The apparatus of claim 1, further comprising a third diffractive structure, wherein the first diffractive structure is configured to diffract the light in the direction of the third diffractive structure into the waveguide, wherein the third diffractive structure is arranged to expand the light in the waveguide in a first direction and to diffract the light in the direction of the second diffractive structure, and wherein the second diffractive structure is configured to expand the light in a second direction, which is substantially perpendicular to the first direction.

5. The apparatus of claim 4, wherein the third diffractive structure comprises a volume holographic grating.

6. The apparatus of claim 4, wherein the third diffractive structure has an efficiency that varies in the first direction, and wherein the second diffractive structure has an efficiency that varies in the second direction.

7. The apparatus of claim 4 wherein at least one of the first, second, and third diffractive structures is formed as a reflection grating.

8. The apparatus of claim 4, wherein the second diffractive structure has a spatially varying efficiency.

9. The apparatus of claim 4, wherein at least one of the first, second, and third diffractive structures is a wavelength-selective diffractive structure.

10. The apparatus of claim 9, wherein each wavelength-selective diffractive structure comprises a first partial structure, which is selective for a first group of wavelengths, and a second partial structure, which is selective for a second group of wavelengths, with the first group of wavelengths differing from the second group of wavelengths.

11. The apparatus of claim 10, wherein the first group of wavelengths and the second group of wavelengths in each case have a wavelength in the red, green and blue spectral range.

12. The apparatus of claim 10, wherein the first partial structure is arranged above the second partial structure.

13. The apparatus of claim 10, wherein the second diffractive structure is configured to couple out the first group of wavelengths in a different direction than the second group of wavelengths.

14. The apparatus of claim 1, wherein the second diffractive structure has imaging properties.

15. The apparatus of claim 1, wherein the combiner is a projection surface, and wherein the light output from the optical adaptation unit provides for the data superimposition on the projection surface.

16. The apparatus of claim 15, wherein the projection surface is one of a windshield or a helmet visor.

17. The apparatus of claim 1, wherein the light beam has two or more groups of wavelengths and wherein the waveguide is frequency-selective and outputs the two or more groups of wavelengths at different output angles.

18. A method for projecting information onto a projection surface, the method comprising:

generating a modulated light beam by modulating a light beam according to the information to be superimposed on the projection surface;

directing the modulated light beam into a waveguide that outputs an expanded light beam towards the projection surface, based on redirecting and expanding the modulated light beam; and focusing the expanded light beam onto the projection surface via a variable optical unit that is disposed in the path of the expanded light beam and provides a variable focal length, thereby projecting the information onto the projection surface.

19. The method of claim 18, wherein the projection surface comprises a windshield or a helmet visor, such that the information is superimposed onto a view provided through the windshield or the helmet visor.

20. The method of claim 18, wherein the modulated light beam has two or more groups of wavelengths and wherein the waveguide is frequency-selective and outputs light in the two or more groups of wavelengths at different output angles, as said expanded light beam.

* * * * *

UNITED STATES PATENT AND TRADEMARK OFFICE
CERTIFICATE OF CORRECTION

PATENT NO. : 11,474,347 B2
APPLICATION NO. : 16/328056
DATED : October 18, 2022
INVENTOR(S) : C. Erler et al.

Page 1 of 1

It is certified that error appears in the above-identified patent and that said Letters Patent is hereby corrected as shown below:

In the Specification

Column 4, Line 5, please change "grating 10" to -- grating 11 --
Column 7, Line 26, please change "waveguide 7" to -- waveguide 70 --
Column 7, Line 41, please change "beam 12A" to -- beam 21A --
Column 10, Line 21, please change "beams 15" to -- beams 151 --
Column 10, Line 37, please change "the Fresnel" to -- the Alvarez --

Signed and Sealed this
Twentieth Day of February, 2024

Katherine Kelly Vidal
*Director of the United States Patent and Trademark Office*